(12) United States Patent
Zafar et al.

(10) Patent No.: US 8,738,639 B1
(45) Date of Patent: May 27, 2014

(54) METHODS AND SYSTEMS FOR AN INFORMATION DIRECTORY PROVIDING AUDIOVISUAL CONTENT

(75) Inventors: Shadman Zafar, Coppell, TX (US); Brian F. Roberts, Frisco, TX (US); Shafiq Kassam, Lewisville, TX (US); Enrique Ruiz-Velasco, Flower Mound, TX (US)

(73) Assignee: Verizon Data Services LLC, Temple Terrace, FL (US)

( * ) Notice: Subject to any disclaimer, the term of this patent is extended or adjusted under 35 U.S.C. 154(b) by 1376 days.

(21) Appl. No.: 11/359,560

(22) Filed: Feb. 23, 2006

(51) Int. Cl.
G06F 7/00 (2006.01)
G06F 17/30 (2006.01)

(52) U.S. Cl.
USPC .......................................... 707/752; 715/739

(58) Field of Classification Search
None
See application file for complete search history.

(56) References Cited

U.S. PATENT DOCUMENTS

| | | | | |
|---|---|---|---|---|
| 5,339,423 | A * | 8/1994 | Beitel et al. ............................. | 1/1 |
| 6,026,371 | A * | 2/2000 | Beck et al. ....................... | 705/14 |
| 6,052,439 | A * | 4/2000 | Gerszberg et al. .......... | 379/88.01 |
| 6,119,133 | A * | 9/2000 | Nusbickel et al. ............ | 707/205 |
| 6,523,021 | B1 * | 2/2003 | Monberg et al. ....................... | 1/1 |
| 6,577,714 | B1 * | 6/2003 | Darcie et al. ................ | 379/93.17 |
| 2001/0030667 | A1 * | 10/2001 | Kelts .............................. | 345/854 |
| 2002/0095454 | A1 * | 7/2002 | Reed et al. ..................... | 709/201 |
| 2003/0156687 | A1 * | 8/2003 | Messager ...................... | 379/67.1 |
| 2003/0208774 | A1 * | 11/2003 | Yurt et al. ....................... | 725/115 |
| 2004/0019582 | A1 * | 1/2004 | Brown ............................... | 707/1 |
| 2004/0049728 | A1 * | 3/2004 | Langford .................... | 715/501.1 |
| 2004/0230562 | A1 * | 11/2004 | Wysoczanski et al. ............ | 707/1 |
| 2005/0044061 | A1 * | 2/2005 | Klemow ............................ | 707/1 |
| 2005/0091272 | A1 * | 4/2005 | Smith et al. ................. | 707/104.1 |
| 2005/0216193 | A1 * | 9/2005 | Dorfman et al. ............... | 701/213 |
| 2005/0256766 | A1 * | 11/2005 | Garcia et al. ..................... | 705/14 |
| 2006/0088145 | A1 * | 4/2006 | Reed et al. .................. | 379/88.19 |
| 2007/0038936 | A1 * | 2/2007 | Elmi et al. ..................... | 715/721 |

OTHER PUBLICATIONS superpages.com, 2005, 8 pages, downloaded from http://www.superpages.com, Jun. 23, 2005.
Superpages Com, 2005, 7 pages, downloaded from http://www.superpages.com, Jun. 26, 2005.
Answers Com, 2005, 3 pages, downloaded from http://www answers.com on Jun. 26, 2005.
Budde, P., Internet Technology—Streaming Media, 2002, 8 pages, downloaded from http://www22.verizon.com/about/community/learningcenter/articles on Jun. 8, 2005.

* cited by examiner

Primary Examiner — Augustine K Obisesan

(57) ABSTRACT

Systems and methods provide an online directory service over a network. After receiving a request to view an online directory listing from a network-enabled user terminal, an online directory server may present to the user terminal a directory listing associated with an identifier of audiovisual content. In response to a selection by a user of the listing, the user terminal may provide the identifier associated with the selected directory listing to the directory server. Based on the identifier, the directory server may access the audiovisual content and provide it to the user terminal and may present it to the user in conjunction with the other information of the directory listing.

14 Claims, 7 Drawing Sheets

METHODS AND SYSTEMS FOR AN INFORMATION DIRECTORY PROVIDING AUDIOVISUAL CONTENT

BACKGROUND INFORMATION

Information directories are a common means for individuals and businesses to obtain information about people, products and services. For instance, a telephone service provider may publish a directory listing its subscribers in a particular geographic region. These so-called "white pages" generally provide an alphabetical listing of subscribers' names, telephone numbers and street addresses. Similarly, a telephone service provider may publish a directory of business subscribers in a particular region. These "yellow pages" generally list subscribers alphabetically within predetermined business categories. Furthermore, a "yellow pages" listing may be supplemented with an advertisement including information about the subscriber. For instance, a typical listing may include a variety of information such as graphics, logos, mottos, business hours, product descriptions, services, specialties, certifications, payment options, delivery information, appointment information, an Internet uniform resource locator (URL), e-mail addresses, business history, customer recommendations, maps and directions.

With the growth of the World Wide Web, some directory service providers now publish their directories online. For example, SUPERPAGES.COM published by Verizon provides an interactive, nationwide directory service enabling users to perform categorical and keyword searches of the information contained in a directory. Similar online directory services are known to enhance their directory listings with media content. For instance, France Telecom augments an online directory with photographs of subscriber's addresses, enabling customers to view a photograph of a location in addition to the subscriber's phone number and street address. The Internet search engine, A9.com offers a similar feature providing photographs in conjunction with directory listings.

DETAILED DESCRIPTION OF PREFERRED EMBODIMENTS

The preferred embodiments according to the present invention implement systems and methods for providing an online directory service. The preferred online directory service may receive a user's request to view an online directory listing from the user's network-enabled user terminal. In response, an online directory server may present to the user terminal a directory listing having an identifier of audiovisual content. Based on a selection of the listing by a user, the user terminal may provide the identifier to the directory server. Then, based on the identifier, the directory server may access the audiovisual content associated with the selected directory listing and provide it to the user terminal where it may be presented to the user in conjunction with the other directory listing information.

The preferred embodiments according to the present invention will now be discussed in additional detail with reference to the figures provided herewith. Wherever possible, the same reference numbers are used throughout the accompanying figures to refer to the same or like elements. The figures illustrate the preferred exemplary embodiments and implementations consistent with the present invention, but the description of those embodiments does not indicate or imply that other embodiments or implementations do not fall within the scope of present invention. It is to be understood that other implementations may be utilized and that structural and procedural changes may be made without departing from the scope of present invention.

For the purposes of the present invention, references to "audiovisual content" are intended to encompass content that comprises both moving pictures and audio, such as typically provided over broadcast television. Specific examples of such audiovisual content would be commercial advertisements and instructional videos, although other types of content would fall with this description of "audiovisual content" (e.g., motion pictures, narrated/musically accompanied slideshows).

Figure 1:
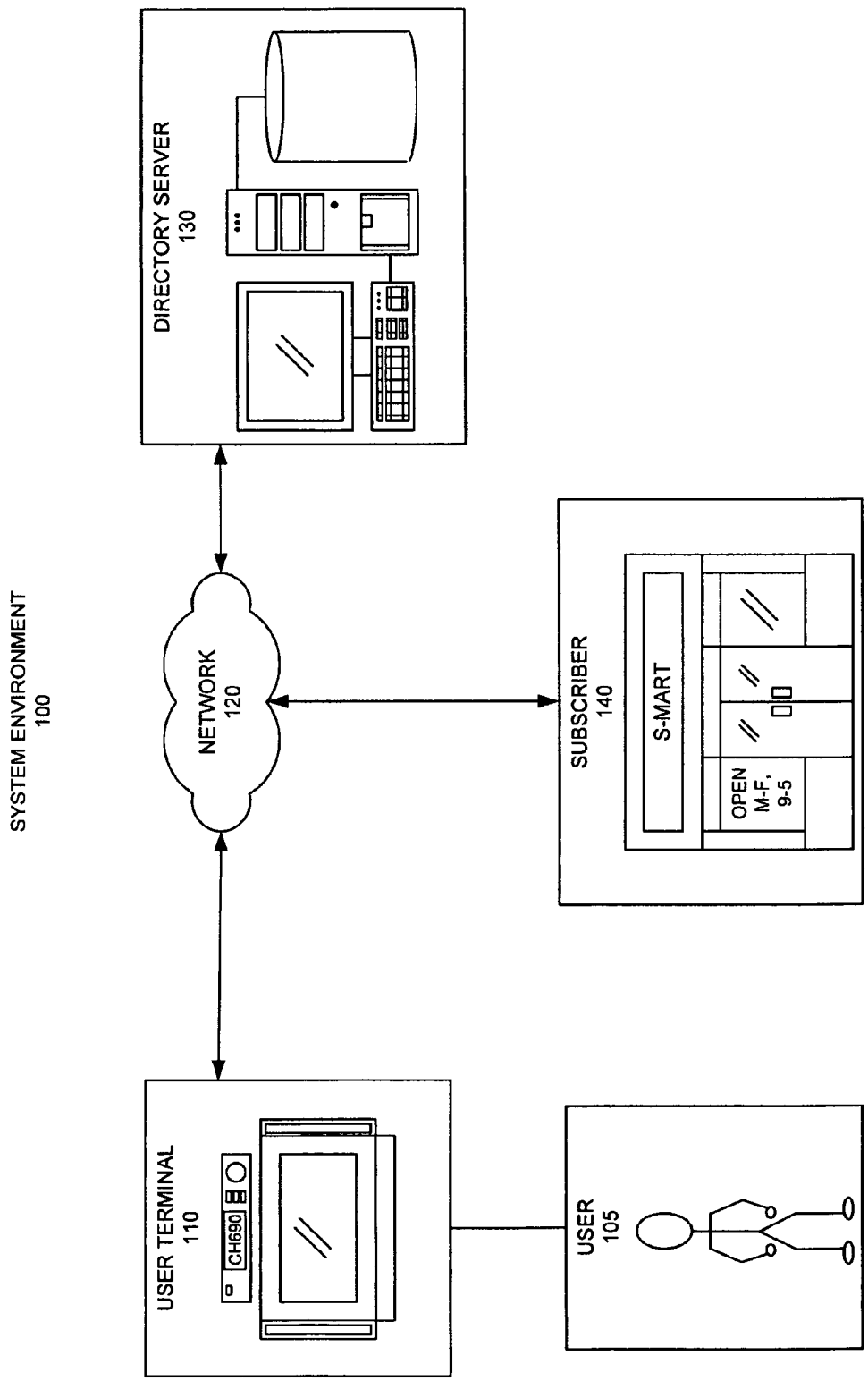
FIG. 1 illustrates a block diagram of an exemplary system environment consistent with certain aspects related to the present invention.

FIG. 1 provides a block diagram exemplifying system environment 100 consistent with the preferred embodiment described herein. System environment 100 may include user 105, user terminal 110, network 120, directory server 130 and subscriber 140.

User 105 may be any individual or public, charitable, commercial, governmental or any other legal entity. User terminal 110 be one or more data processing systems that perform computer executed processes for providing user 105 an interface to network 120. User terminal 110 may be implemented as one or more computer systems including, for example, a personal computer, minicomputer, microprocessor, workstation or similar computer platform typically employed in the art. Alternatively, user terminal 110 may be embedded within a specialized computing system including, for example, a "set-top box" for receiving and displaying television broadcasts, video telephone, mobile telephone, personal digital assistant or video game device. User terminal 110 may be located in a user's home, at a business, in a public kiosk or in a portable device. Furthermore, user terminal 110 may be a owned by user 105 or may be provided to user 105 in conjunction with other services such as television broadcasting, Internet service or telephone service.

Network 120 may be one or more networks that communicate information between, at least, user terminal 110 and directory server 130. Network 120 may be any type of network for communicating information, including data, text, pictures, voice and video. In some instances, network 120 has sufficient bandwidth to present audiovisual content transmitted from directory server 130 to user terminal 110 in real-time. Network 120 may be a shared, public, private, client-server, or peer-to-peer network encompassing a wide or local area including an extranet, an Intranet, the Internet, a local area network ("LAN"), wide area network ("WAN"), public switched telephone network ("PSTN"), integrated services digital network ("ISDN"), radio links, terrestrial wireless network, cable television network, satellite television network and any other form of wired or wireless communication networks. Further, network 120 may be compatible with any type of communication protocol used by the components of the system environment to exchange information, such as Transmission Control/Internet Protocol (TCP/IP), Hypertext Transfer Protocol (HTTP), Hypertext Transfer Protocol, Secure (HTTPS), Real-time Transport Protocol (RTP), Real Time Streaming Protocol (RTSP), Global System for Mobile Communication (GSM) and Code Division Multiple Access (CDMA) wireless formats, Wireless Application Protocol (WAP), user datagram protocol (UDP); the file transfer protocol (FTP), high bandwidth wireless protocols (e.g., EV-DO, WCDMA) or peer-to-peer protocol. Network 120 may be provided by one or more service providers, such as an Internet Service Provider (ISP), a wired/wireless telephone service provider, a cable or satellite television provider, an operator of WAN or LAN, or an operator of a point-to-point network.

Directory server 130 may be one or more computer systems including, for example, a personal computer, minicomputer, microprocessor, workstation or similar computer platform typically employed in the art. Directory server 130 executes computer-executable instructions for providing online directory services to user terminal 110 over network 120, as described further below.

Subscriber 140 is typically an individual or business, but may be any public, charitable, governmental or other legal entity. In some cases, subscriber 140 may submit information to the online directory service for the purpose of advertising goods and/or services. In other cases, subscriber 140 may be listed by the online directory service without submitting any information. For instance, subscriber 140 may be a telephone subscriber whose information is listed by the online directory service provider in conjunction with the subscriber's telephone service.

The general interaction between the elements 105-140 illustrated in FIG. 1 is as follows. Subscriber 140 may submit directory listing information to a service provider, which is stored in a computer-readable medium at and/or accessible by directory server 130. For instance, the information may be stored as a record in a relational database of directory records. The information may be provided by subscriber 140 to directory server 130 by typical communication means. In some instances, for example, subscriber 140 may provide directory listing information to directory server 130 over network 120 through online enrollment. In addition to directory listing information, subscriber 140 may also submit audiovisual content which may be stored on directory server 130 (or accessible to directory server 130) in association with subscriber's 140 directory listing information. If so, the directory record of subscriber 140 may additionally include an identifier of the audiovisual content.

After submission of the directory listing information and audiovisual content to the online directory service by subscriber 140, the directory information and audiovisual content may then be provided in response to a request for a directory listing. For example, through an application executing on user terminal 110, user 105 may access directory server 130 and submit a search request. In response to the search request, directory server 130 may search the stored directory information to identify records meeting some or all of the search criteria associated with the search request, and generate a search result including, for example, at least a portion of the directory information of subscriber 140, as well as the identifier of subscriber's 140 audiovisual content. This search result may be provided to user terminal 110 in, for instance, an interactive (dynamically generated) web page including a list of the subscribers identified in the search result. If user 105 selects the listing of subscriber 140, user terminal 110 may transmit the audiovisual content identifier to directory server 130 over network 120. In response to the identifier, directory server 130 may retrieve the associated audiovisual content from storage and provide it to user terminal 110 for presentation to user 105.

As illustrated in FIG. 1, system environment 100 includes a single user 105, user terminal 110, network 120, directory server 130, and subscriber 140. However, as is readily apparent to an artisan, practical embodiments may include a plurality of users, user terminals, servers, and/or subscribers linked over multiple networks by a plurality of network exchange points sharing data between the plurality of networks.

Figure 2:
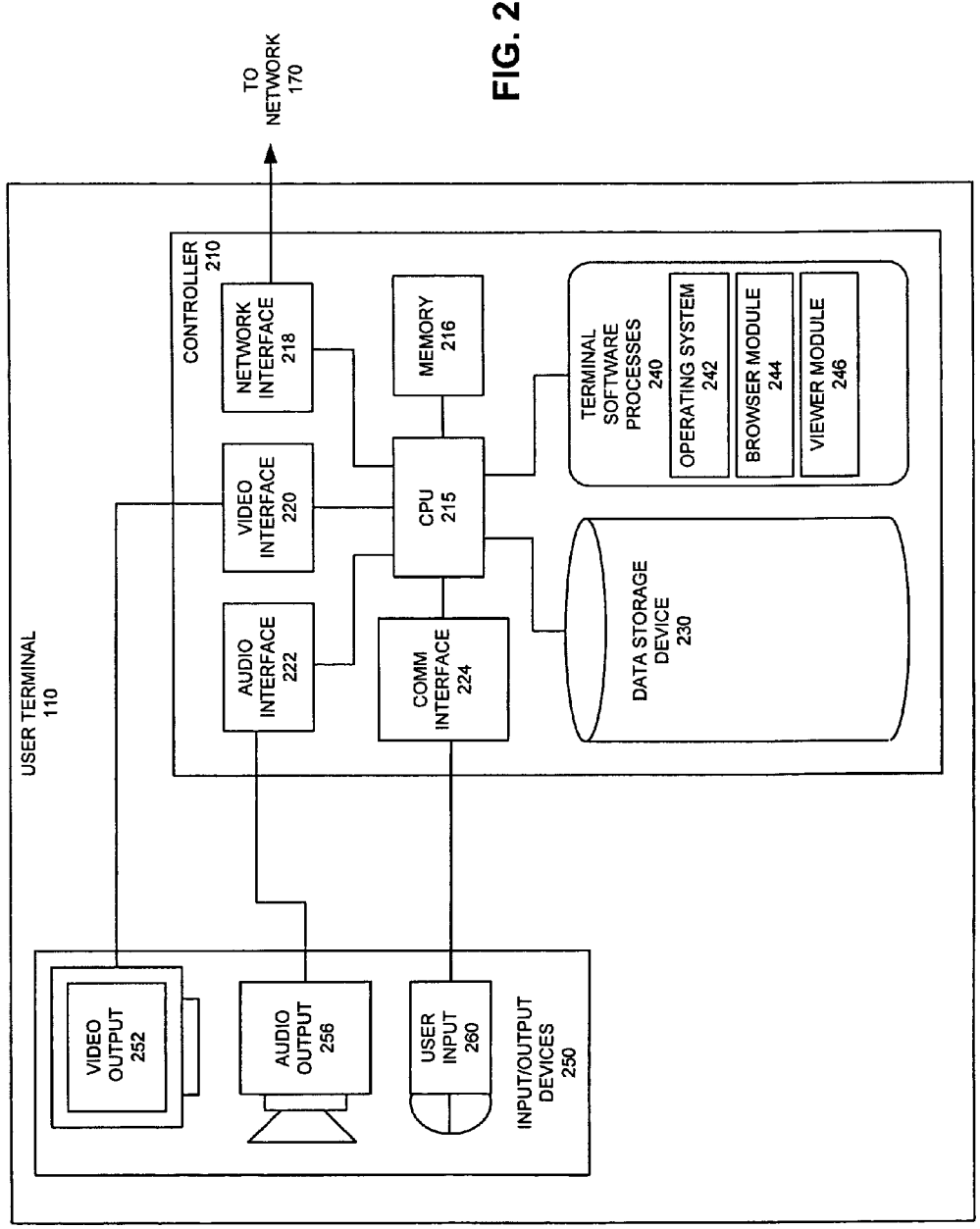
FIG. 2 illustrates a block diagram of an exemplary user terminal consistent with certain aspects related to the present invention.

FIG. 2 provides a block diagram illustrating exemplary user terminal 110 that provides user 105 an interface to directory server 130 over network 120. User terminal 110 may include controller 210 and input/output devices 250. Controller 210 may be one or more processing devices that execute computer instructions stored in one or more memory devices to provide functions consistent with certain aspects of the preferred embodiments described herein. Controller 210 may include, for example, central processing unit (CPU) 215, memory 216, network interface 218, video interface 220, audio interface 222, communications interface 224 and data storage device 230.

CPU 215 provides control and processing functions for user terminal 110 using executable instructions and data, for example, stored in memory 216 and/or data storage device 230. Although FIG. 2 illustrates a single CPU 215, controller 210 may include multiple CPUs. CPU 215 may also include, for example, a coprocessor, memory, registers, and/or other processing devices and systems as appropriate. CPU 215 may be any conventional processor such as off-the-shelf microprocessor (e.g., INTEL PENTIUM); or an application-specific integrated circuit adapted specifically for a user terminal 110.

Memory 216 may be one or more memory devices storing data and instructions that, when executed by CPU 215, perform the processes described herein. Memory 216 may include semiconductor and magnetic memories such as random access memory ("RAM"), read-only memory ("ROM"), electronically erasable programmable ROM ("EEPROM"), flash memory, optical disks, magnetic disks, etc. When user terminal 110 executes an application installed in data storage device 230, CPU 215 may download at least a portion of instructions from data storage device 230 into memory 216.

Network interface 218 may be one or more hardware and/or software components configured to translate information sent between CPU 215 and network 120. For example, network interface 218 may be a modem, or a local area network ("LAN") port. Network interface 218 may support any telecommunications or data network including; for example, Ethernet, WiFi, token ring, ATM, ISDN. Alternatively, network interface 218 may be an external device connected to controller 210 though communications interface 224.

Video interface 220 may be any device for translating information exchanged between CPU 215 and video output device 252. For instance, video interface 220 may include a digital-to-analog converter for converting digital video data from CPU 215 into analog video signals for video output device 252. Furthermore, video interface 220 may include a CODEC for decompressing the video information stored in a compressed format (e.g., MPEG). Although video interface 220 is described as hardware device, it may also be implemented software, firmware, or in a combination thereof.

Audio interface 222 may be any device for enabling information exchange between CPU 215 and audio output device 256. For instance, audio interface 222 may include a digital-to-analog converter for converting digital audio data into analog audio signals for audio output device 256. Furthermore, audio interface 220 may include a CODEC for decompressing audio data stored in a compressed format (e.g., MP3). Although audio interface 222 is described as hardware device, it may also be implemented completely in software, firmware, or a combination thereof.

Communications interface 224 provides one or more interfaces for exchanging data between controller 210 and external devices, including input/output devices 250. Communications interface 224 may include, for example, a serial port (e.g., RS-232, RS-422, universal serial bus (USB), IEEE-1394), parallel port (e.g., IEEE 1284), or wireless port (e.g., infrared, ultraviolet or radio-frequency transceiver). In some embodiments, audio, video and/or network data may be exchanged with CPU 215 through communications interface 224.

Data storage device 230 may provide storage for user terminal 110. Data storage device 230 may be implemented with a variety of components or subsystems including, for example, a magnetic disk drive, an optical disk drive, flash memory or other devices capable of permanently storing information. Further, although data storage device 230 is shown within user terminal 110, data storage device 230 may be implemented external to user terminal 110. Data storage device 230 may include program code and data for user terminal 110 to communicate with directory server 130. In addition, data storage device 230 may include program instructions and data for an operating system 242, a network browser 244 and a media viewer 246.

Exemplary input/output devices 250 include video output 252, audio output 256 and user input 260. Video output 240 may be any device for displaying visual information such as a cathode ray tube (CRT), liquid crystal display (LCD), light emitting diode display (LED), plasma display, or electroluminescent display. Audio output device 256 may be a speaker, headphone, earpiece, or other audio transducer that converts electrical signals into audible tones. User input device 260 may be any conventional device for communicating user's commands to user terminal 110 including a keyboard, keypad, computer mouse, touch screen, trackball, scroll wheel, joystick, television remote controller, or voice recognition controller.

The configuration or relationship of components illustrated in FIG. 2 is exemplary. The components of user terminal 110 may be independent components operatively connected, or they may be combined within a single device including the functions of some or all of the aforementioned components. For example, input/output devices 250 may be a plurality of independent devices within separate housings detachably connected to a generic controller 210, such as a personal computer or home entertainment system. In other implementations, controller 210 and input/output devices 250 may be integrated within a single housing with a specialized controller 210 such as a portable telephone. One of ordinary skill in the art may select different configurations of components based on the requirements of a particular implementation of user terminal 110 giving consideration to factors including, but not limited to, cost, size, speed, form factor, capacity, portability, power consumption and reliability.

As further illustrated FIG. 2, user terminal 110 may execute software processes 240. Computer-executable instructions providing software processes may be stored in memory 216 and/or data storage device 230 and include, for example, operating system 242, browser module 244 and viewer module 246.

Operating system 242 may include computer-executable instructions executed by CPU 215 for managing the execution of instructions, memory, data storage, devices, security and/or network communications. In addition, operating system 242 may provide a user interface enabling user 105 to interact with user terminal 200 via video output 252, audio output 256 and user input 260. For example, the user interface may be a graphics user interface displayed on a computer display through which user 105 interacts by entering information with a computer mouse and keyboard, such as provided in WINDOWS published by Microsoft Corporation. Alternatively, the user interface may be an on-screen menu generated by a set-top box and displayed on a television through which user 105 interacts by entering information using a wireless remote control.

Browser module 244 includes computer-executable instructions executed by CPU 215 for enabling user 105 to view and interact with documents hosted by directory server 130 and/or other network servers. For instance, browser module 244 may be an Internet browser for rendering web pages (documents accessible on the World Wide Web of the Internet) with content formatted using the hypertext markup language (HTML) or variants thereof. Such pages may be retrieved from web servers using the hypertext transfer protocol (HTTP). In some implementations, browser module 244 may be a third-party browser such as INTERNET EXPLORER by Microsoft Corporation, or SAFARI by Apple Computer, Inc. In other implementations, browser module 244 may be adapted for a particular user terminal 200 and/or network 120 such as a set-top box connected to a cable television network.

Viewer module 246 may include computer-executable instructions processed by CPU 215 for providing an interactive user interface for viewing audiovisual content through video output 252 and/or audio output 256. Viewer module 246 may provide controls for playing, recording, rewinding, reviewing, cueing, fast-forwarding, and pausing audiovisual content and other forms of media. In some implementations, viewer module 246 may be a third-party media viewer such as WINDOWS MEDIA PLAYER published by Microsoft Corp. or QUICKTIME published by Apple Computer, Inc. In other implementations, viewer module 246 may be integrated with browser module 244, forming a unified browser and reviewed. In other implementations, these modules may be separate but operate together as requested.

The configuration or relationship of software modules 242-246 illustrated in FIG. 2 is exemplary. In accordance with certain aspects of the present invention, software processes 240-246 may be independent applications, or they may be combined within a single application including the functions of some or all of the modules.

Figure 3:
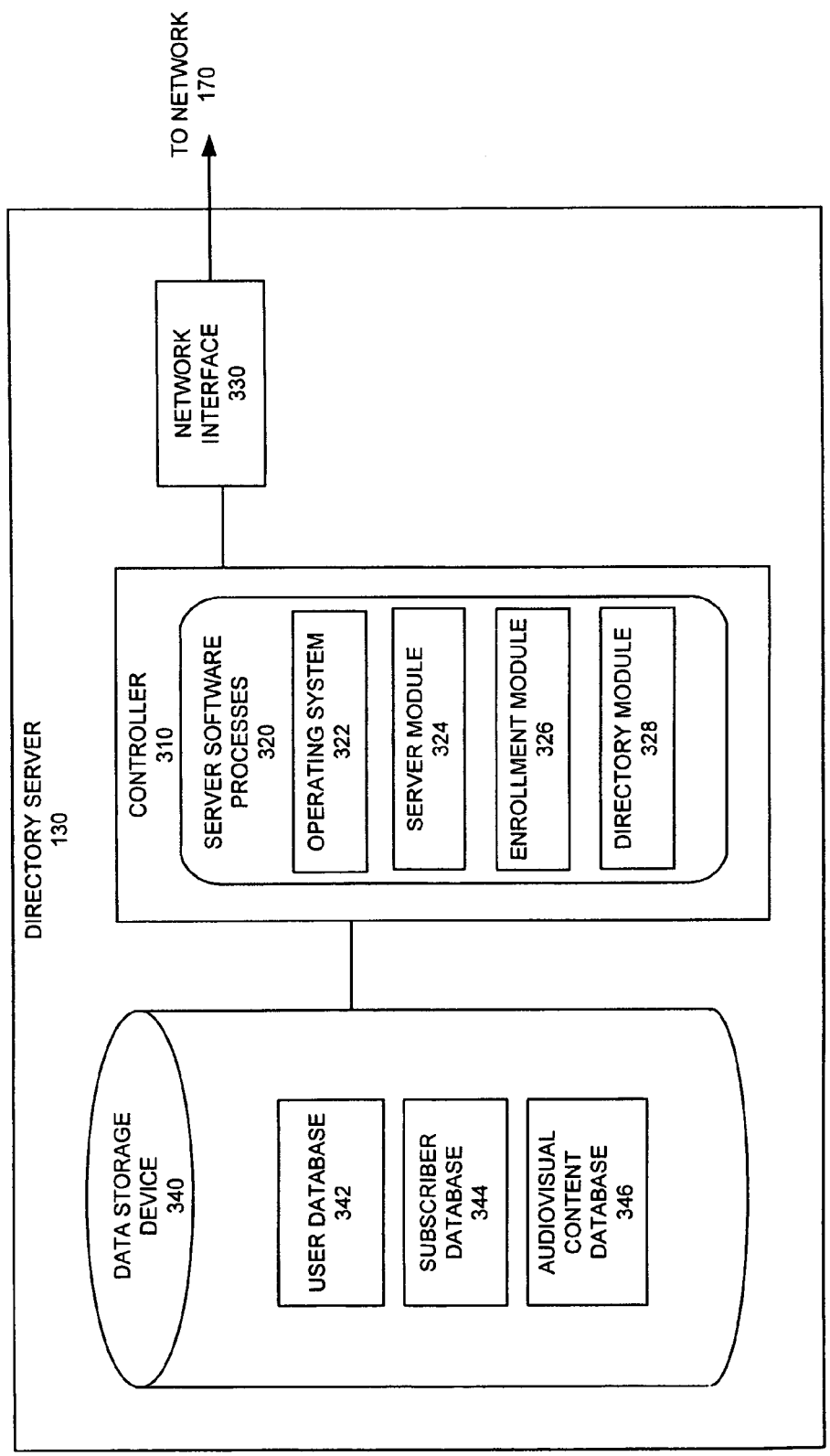
FIG. 3 illustrates a block diagram of an exemplary directory server consistent with certain aspects of data related to the present invention.

FIG. 3 provides a block diagram of an exemplary directory server 130 which may be one or more processing devices that execute software modules stored in one or more computer memory devices. Directory server 130 may comprise a system including a server system 305 that includes controller 310, network interface 330 and data storage device 340, and a directory database 350.

Controller 310 may be one or more generic computer systems including, for example, personal computer, minicomputer, microprocessor, workstation or similar computer platform typically employed in the art. Controller 310 may be comprised of a CPU and memory for storing and executing data and instructions. CPU may be any conventional controller such as an off-the-shelf microprocessor (e.g., Intel PENTIUM), or an application-specific integrate circuit adapted for a specific server 130. CPU may process instructions and data stored in computer memory and/or data storage device 340. Memory may be one or more memory devices that store data, operating system and software modules that, when executed by controller 310, perform processes consistent with certain aspects related to the present invention. These memory devices may include semiconductor and magnetic memories such as RAM, ROM, EEPROM, flash memory, optical disks, magnetic disks, etc. Network interface 330 may support any telecommunications or data network including, for example, Ethernet, WiFi, token ring, Fiber Distributed Data Interface. Data storage device 340 may be one or more memory devices to store data and executable instructions used by controller 310.

Directory database 350 may be a standalone database system in communication with server system 305, or may be incorporated into server system 305 (e.g., as part of data storage device 340). Directory database 350 may include user database 342, subscriber database 344 and audiovisual content database 346. User database 342 may store records including information describing one or more users 105 of the online directory service. Subscriber database 344 may store records including information describing one or more subscribers of the online directory service. Audiovisual content database 346 may store audiovisual content associated with various subscriber listings. Each of the foregoing databases are further described below.

As further illustrated FIG. 3, controller 310 may execute a plurality of software processes 320 for providing, among other things, an online directory service that implements the preferred embodiments described herein. Computer-executable instructions providing software processes 320 may be stored in computer memory and/or data storage device 340 including, an operating system 322, server module 324, enrollment module 326 and directory module 328.

Operating system 322 may include computer-executable instructions executed by controller 310 for managing the execution of instructions, memory, data storage, devices, security and/or network communications. In addition, operating system 322 may provide a user interface such as provided in WINDOWS published by Microsoft Corporation.

Server module 324 may include computer-executable instructions executed by controller 310 for receiving and transmitting data traffic over network 120 from user terminal 110 and/or subscriber 140. For example, server module 324 may be a standard web server that user terminal 110 may access with a network browser 244, such as the Apache web server.

Figure 4:
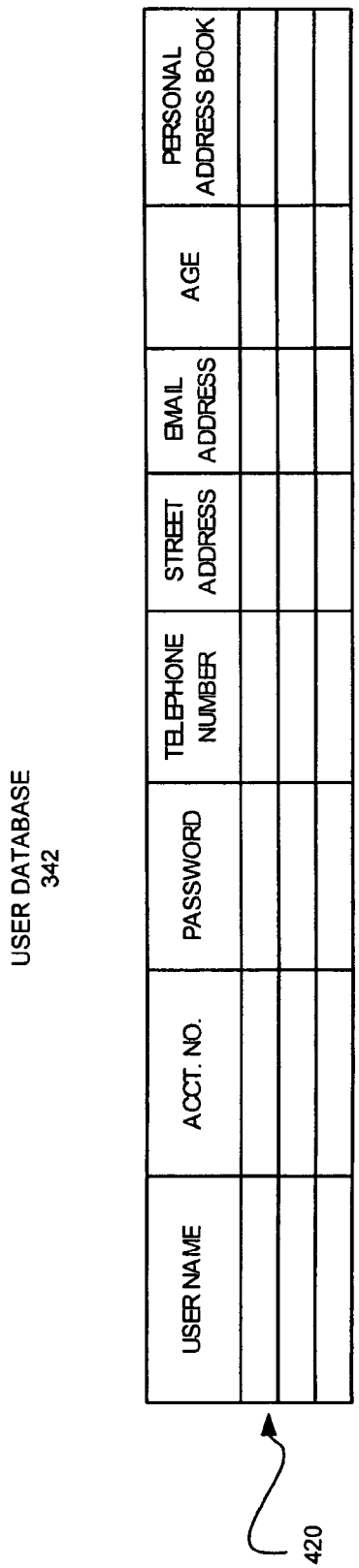
FIG. 4 illustrates a block diagram of exemplary user account database stored at a directory server consistent with certain aspects of data related to the present invention.

Enrollment module 326 includes computer-executable instructions executed by controller 310 for receiving and storing information from user 105 and/or subscriber 140. For example, users may enroll with the online directory service. Enrollment module 326 may generate a webpage displaying an online enrollment form. The information submitted by user 105 in the form may be used to populate the user record 420 in user database 342. As shown in FIG. 4, enrollment module 326 may collect information from user 105 such a name, account number, username, password telephone number, street address, electronic mail address, provider, credit card account number and/or age.

Figure 5:
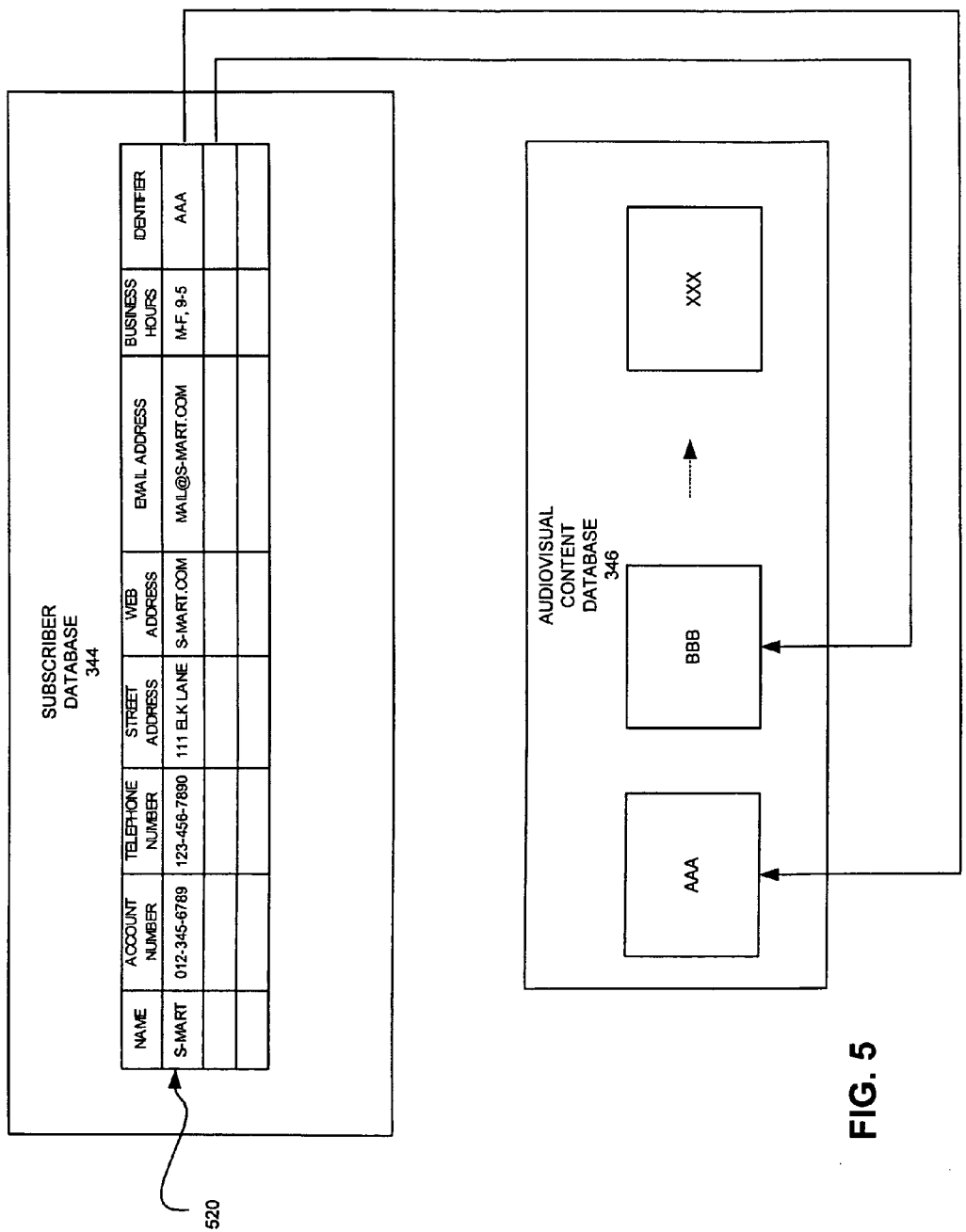
FIG. 5 illustrates a block diagram of exemplary subscriber database and audiovisual content database stored at a directory server consistent with certain aspects of data related to the present invention.

Subscribers may also enroll with the online directory service. A subscriber 140 may enroll by any typical means of communication such as in-person, via mail, electronic mail or online. In some embodiments, enrollment module 326 may provide an interactive webpage accessible over network 120 including an online enrollment form in which subscriber 140 submits directory information, such as subscriber identification, account number, telephone number, street address, web page address, e-mail address, business hours and/or business category. Enrollment module 326 may also enable subscriber 140 to submit audiovisual content for association with subscriber's 140 directory listing. As shown in FIG. 5, subscriber 140 information may be used to populate subscriber record 520 in subscriber database 344.

Directory module 328 may include computer-executable instructions executed by controller 310 for generating online directory 600 consistent with embodiments of the present invention. Directory module 328 functions to generate and control online directory 600, enabling user 105 to access, search, view, select and store one or more subscriber 140 directory listings. For instance, directory 600 may be a interactive user interface generated though XML and/or HTML, and displayed to user 105 by network browser module 244 as a webpage. In the typical manner, directory module 328 may enable user 105 may to selectively sort the list based on any one of the displayed categories.

FIG. 4 is a block diagram illustrating an exemplary user account database 342 including user record 420. User record 420 may include, for example, user name, account number, password, telephone number, street address, electronic mail address, and/or age. In addition, user record 420 may be associated with other data files of user 105, such as a personal address book of directory listings generated by user 105.

FIG. 5 is a block diagram illustrating an exemplary subscriber database 344 including subscriber record 520. Subscriber record 520 may include, for example, name, account number, telephone number, street address, Internet webpage address, electronic mail address, business hours, account number and/or other subscriber 140 information that may be included in the subscriber's directory listing. If the subscriber's directory listing is associated with audiovisual content, subscriber record 520 may additionally store an identifier associating subscriber record 520 with the audiovisual content stored in audiovisual content database 336. For example, as shown in FIG. 5, subscriber record 520 includes an identifier associating subscriber record 520 with audiovisual content "AAA" in content database 346. Although subscriber record 520 is illustrated as being associated with a single audiovisual content file, it may be associated with any number of audiovisual files. In addition, although subscriber 140 is illustrated as being associated with only a single listing, in alternate embodiments a single subscriber 140 may be associated with a plurality of listings (e.g., represented by multiple subscriber records 520) each of which may be associated with audiovisual content data files.

Figure 6:
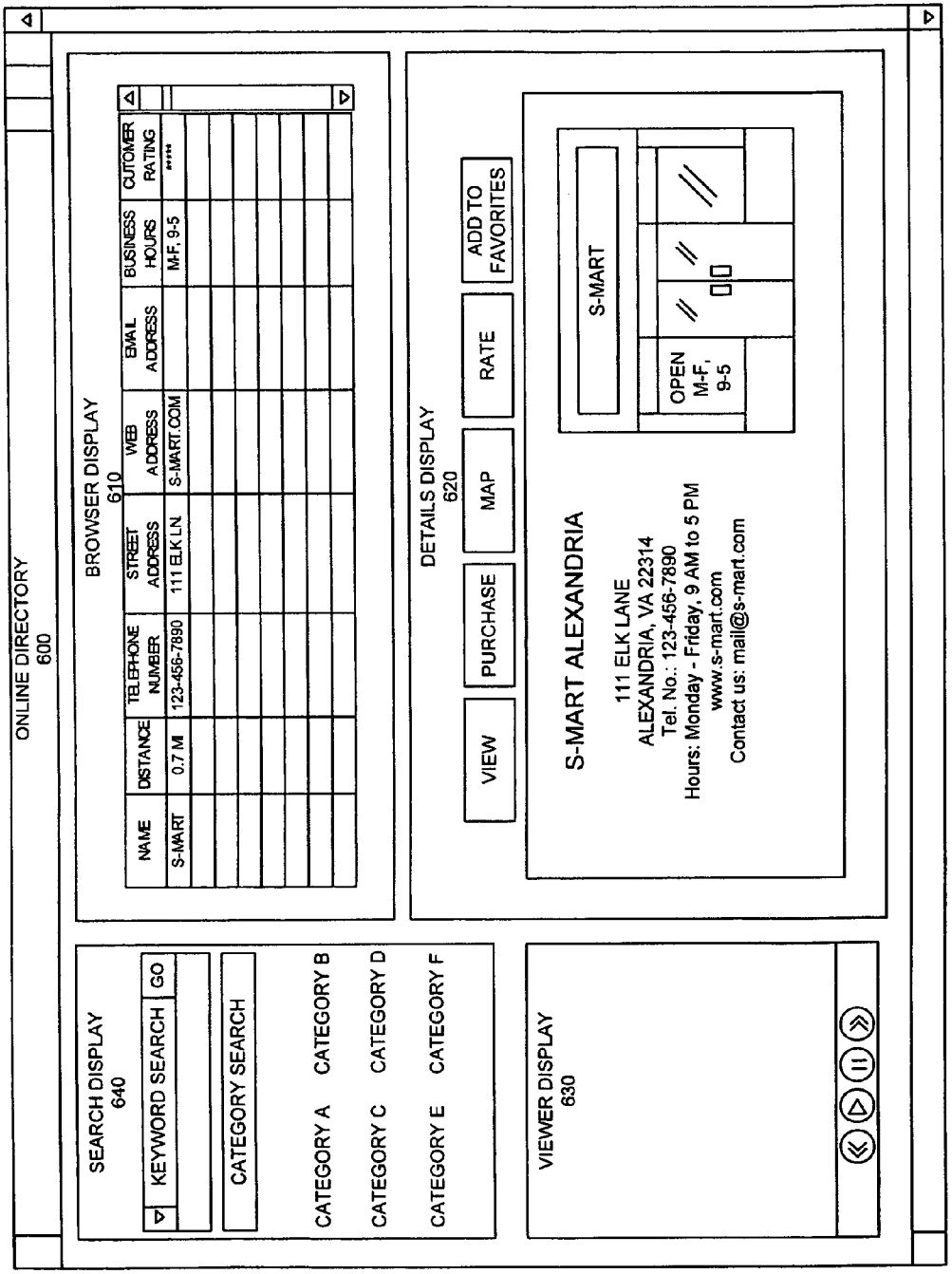
FIG. 6 illustrates an exemplary online directory consistent with certain aspects related to the present invention.

FIG. 6 provides a diagram illustrating an exemplary online directory 600 provided by the online directory service. Based at least in part on data from subscriber database 344, directory module 328 may generate online directory 600 accessible by user terminal 110 over network 120. For instance, online directory 600 may be an interactive user interface generated though XML and/or HTML, and displayed to user 105 by network browser module 244 as an interactive webpage. Online directory 600 may include interactive user displays, for example, browser display 610, details display 620, viewer display 630 and search display 640.

Browser display 610 may provide an interactive user-interface enabling user 105 to view, sort and select directory listings. In particular, as shown in FIG. 6, browser display may present user 105 an sortable list of directory listings based, at least in part, on subscriber records 520 stored in subscriber database 344. Browser display may supplement the subscriber's information with additional information such as the distance between the subscriber's address and the user's address, and/or customer ratings of subscriber. This listings presented on browser display 610 may be generated based on search criteria submitted by user 105. Alternatively, browser display 610 may display listings stored in a personal address book associated with the user's account. Although browser display 610 is shown in FIG. 6 as containing only a limited number of directory listings, one of ordinary skill in the art will recognize that browser display 610 may contain any number of listings, and that the listings may be paged or indexed.

Details display 620 may present a detailed view of directory information associated with a listing selected by user 105 from browser display 610, including audiovisual content associated with the listing, if any. For instance, details display 620 may provide a stylized display of subscriber 140 information supplemented with additional information such as text, graphics and details of subscriber's 140 products and/or services. Details display 620 may also enable user 105 to select from a plurality of operations including, "view," "purchase," "map," "rate", and "add-to-favorites". If user 105 selects the "view" operation, then user 105 may view any audiovisual content associated with a selected listing. If user 105 selects "purchase" operation, then online directory server 130 may facilitate the user's purchase of goods or services offered by subscriber 140 for sale online. Alternatively, the selection may enable other interactions with the selected subscriber 140, such as scheduling an appointment. If user 105 selects the "map" operation, online directory 600 may display a street map of the subscriber location and/or providing driving directions from user 105 location to subscriber's 140 location. If user 105 selects the "rate" operation, user 105 may submit a rating of a subscriber 140 or listing which may be stored in association with subscriber record 520. If user 105 selects "add to favorites" a reference to the selected listing may be stored in association with user record 420 in a data file representing, for example a personal address book and enabling user 105 to recall the listing at a later time without submitting another search of the online directory. User 105 may also create custom folders of subscriber records, for instance, storing user's 105 favorite listings based on user-defined categories.

Search display 640 may provide an interactive user interface enabling user 105 to submit search criteria to directory server 130 though user input device 260. Search display 640 may enable user 105 to search directory listings stored in subscriber database 344 based on search criteria. Search criteria may include, for instance, categories or keywords. In particular, search display 640 may present a menu of listing categories from which user 105 may select. For instance, the categories may provide classified categories of business listings, or alphabetical categories of residential listings. Further, the categories may include subcategories enabling user 105 to browse though successively narrower categories of listings. Alternatively, user 105 may perform a keyword search of subscriber database 344. In response to the user's submitted search criteria, online directory 600 may display a subset of directory listings meeting the search criteria in browser display 610. For instance, user 105 may select a business category such as "automobile dealers." In other instances, user 105 may submit a keyword search using, for example, a name, telephone number, street address, e-mail address, Internet web page address, uniform resource locator, product or service.

Although online directory 600, including displays 610-640, is shown in FIG. 6 as being implemented within a single user-interface, one of ordinary skill in the art will readily recognize that in other implementations each display may be a separate user-interface or, alternatively, nested within a series of hierarchical user-interfaces.

Figure 7:
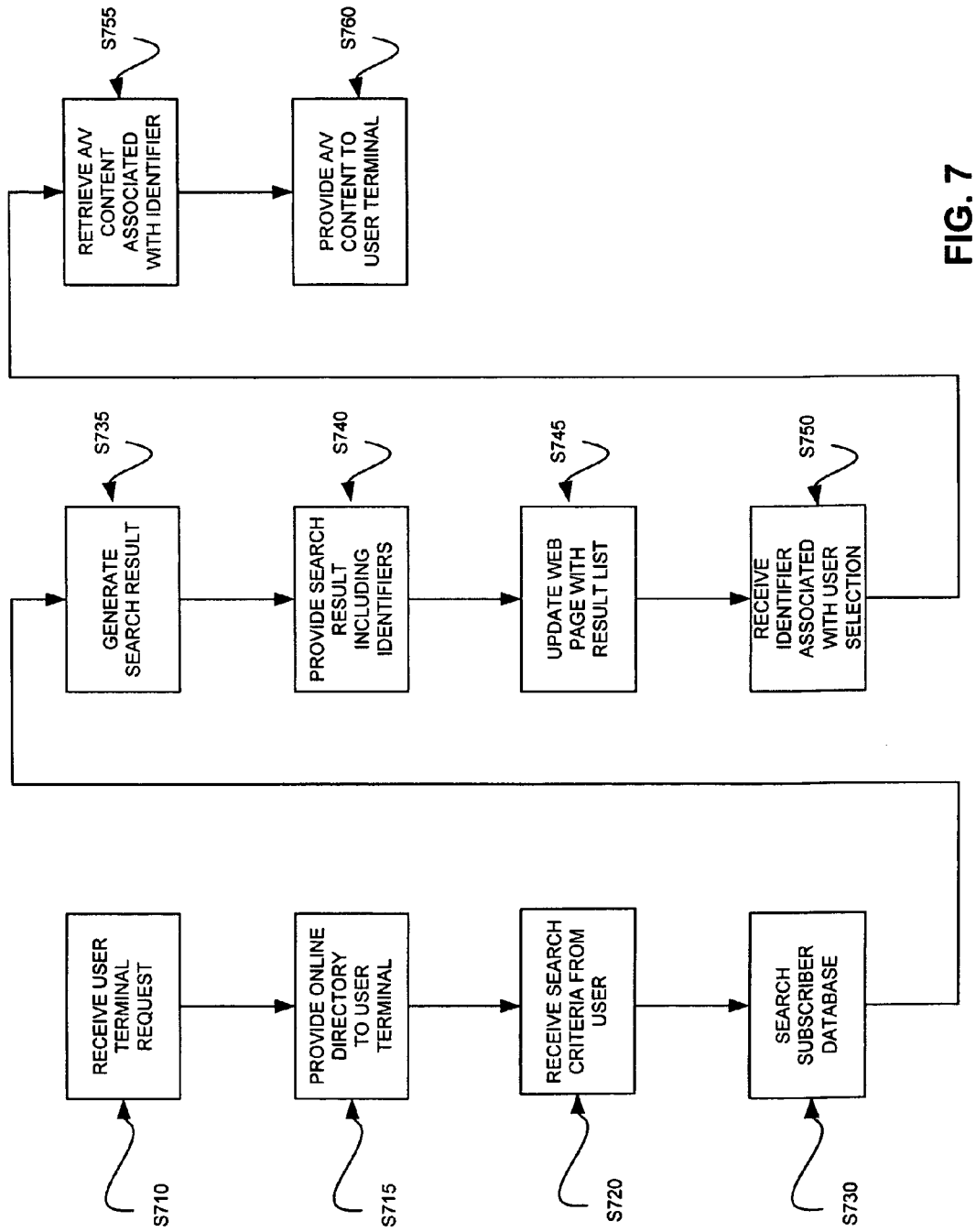
FIG. 7 illustrates a flowchart exemplifying a one aspect related to the present invention.

FIG. 7 provides a block diagram illustrating exemplary process for providing an online directory service including audiovisual content to user 105. Through a user terminal 110, user 105 may access the directory service at directory server 130 using browser module 322. Directory server 130 may receive the user's request to access the directory service (S710) and, in response, may provide an interactive user interface, such as directory interface 600, to user terminal 110 for display on video output device 252. (S715) Through online directory 600, user 105 may enter a search criteria using user input device 260 into, for example search display 640. As discussed above, the search criteria may be a categorical or based on keywords. The user terminal 110 then sends the search criteria to directory server 130.

Upon receipt of the search criteria (S720), directory server 130 may search subscriber database 344 for records satisfying the search criteria, in whole or in part (S730). Based on this search, directory server 130 may generate a search result (S735) and provide the search result to user terminal 110 (S740). User terminal 110 may present the listings included in the search result to user 105 in browser display 610 (S745). For example, as shown in FIG. 6, browser display 610 may present listings meeting the user's search criteria and including information of a subscriber 140 such as name, distance from user 105, telephone number, street address, Internet web page address or URL, electronic mail address, business hours and subscriber rating. Further, the information presented in browser display 610 may be sorted by any of the categories of information. In addition to this listing information, any identifiers of audiovisual content associated with a subscriber's directory listing included in the search result may be provided to user terminal 110. (S740)

User 105 may browse the listings presented in browser display 610 and select a listing with user input device 260. Detailed information of the selected listing may then be presented in details display 620. For example, the user terminal 110 may transmit a message to directory server 130 requesting the detailed listing information, and in response, the directory server 130 may transmit a message containing the detailed listing information. Alternatively, the detailed listing information may already be present at user terminal 110, and the selection may cause the user terminal to provide the detailed listing information in the browser display 610.

If the selected listing has an associated identifier of audiovisual content, when the entry is selected, user terminal 110 may provide the identifier to directory server 130 (S750). The identifier may be a memory address location, an Internet protocol address, a uniform resource locator, video resource locator or any information enabling directory server 130 to locate the audiovisual content in audiovisual database 346. In response, directory server 130 may retrieve the audiovisual content from audiovisual content database 346 (S755) and provide it to user terminal 110 for presentation to user 105, for example, in viewer display 630 (S760) The audiovisual content may be presented to user 105 automatically or, alternatively, the audiovisual content may be retrieved and presented to user 105 on-demand; for example, the audiovisual content associated with the selected directory listing may presented in response to the user's selection of "view" in details display 620.

Providing the audiovisual content to user terminal 110 may be accomplished in various manners. For example, the audiovisual content may be downloaded to the user terminal 110, such that an entire file of the audiovisual content is stored at the user terminal 110. Presentment of the stored audiovisual content may occur before or after the entire file is received. Alternatively, the audiovisual content may be "streamed" to user terminal 110 in (substantially) real-time, such that the audiovisual content is not stored at the user terminal 110 (excluding temporary buffering for playback purposes). The particular transmission method may be selected based on, for example, available bandwidth, capabilities of user terminal 110, content security issues, etc.

Any of the steps of the sequences illustrated in FIG. 7 described above are subject to authentication by user identification, keyword and/or cryptographic key. For example, user verification and/or authorization may be required before accessing network 120, directory server 130, and/or online directory 600. Furthermore, data stored in memory, storage devices and/or contained in video messages may be encrypted.

CONCLUSION

For purposes of explanation only, certain aspects of the preferred embodiments are described herein with reference to the components illustrated in FIGS. 1-7. The functionality of the illustrated components may overlap, however, and may be present in a fewer or greater number of elements and modules. Further, all or part of the functionality of the illustrated elements may co-exist or be distributed among several geographically dispersed locations. Moreover, embodiments, features, aspects and principles of the present invention may be implemented in various environments and are not limited to the illustrated environments.

Further, the sequences of events described in FIG. 7 are exemplary and not intended to be limiting. Thus, other method steps may be used, and even with the methods depicted in FIG. 7, the particular order of events may vary without departing from the scope of the present invention. Moreover, certain steps may not be present and additional steps may be implemented in FIG. 7. Also, the processes described herein are not inherently related to any particular apparatus and may be implemented by any suitable combination of components.

The foregoing description of certain possible implementations consistent with the present invention (as set forth in the appended claims) does not represent a comprehensive list of all such implementations or all variations of the implementations described. The description of only some implementation should not be construed as an intent to exclude other implementations. Artisans will understand how to implement the invention as recited in the appended claims in many other ways, using equivalents and alternatives that do not depart from the scope of the following claims. Moreover, unless indicated to the contrary in the preceding description, none of the components described in the implementations are essential to the invention.

What we claim is:

1. A method performed by a directory system, comprising:
  receiving over a network from a user terminal a request to view a directory listing;
  retrieving the directory listing from a directory database;
  presenting to the user terminal the directory listing;
  receiving, from the user terminal, a selection of a listing from the directory listing associated with a desired business entity;
  determining whether the selected listing includes an identifier of audiovisual content comprising an advertisement for the business entity, wherein the identifier comprises location information for retrieving the audiovisual content;
  receiving over the network from the user terminal the identifier of audiovisual content;
  accessing the audiovisual content based on the received identifier;
  selecting a transmission method based at least in part on a characteristic of the user terminal;
  providing an electronic directory page for the selected listing, the electronic directory page comprising:
    a details display window on the page displaying data associated with the business entity and a favorites option for the selected listing; and
    a viewer display window on the page displaying the audiovisual content; providing the audiovisual content to the user terminal using the selected transmission method via the viewer display window;
  receiving, from the user terminal, a selection of the favorites option; and
  in response to the selection of the favorites option, storing a reference to the selected listing in a user record associated with a user of the user terminal, the user record contained in a user database maintained by the directory system.

2. The method of claim 1, further comprising:
  receiving search criteria from the user terminal; and
  presenting, in response to the search criteria, a plurality of responsive directory listings meeting, at least in part, the search criteria, wherein the selected listing is among the plurality of responsive directory listings.

3. The method of claim 2, wherein the search criteria is at least one of a category and a keyword.

4. The method of claim 3, wherein the keyword includes at least one of: a name, telephone number, street address, e-mail address, Internet web page address, uniform resource locator, product and service.

5. The method of claim 1, wherein providing the audiovisual content includes:
  establishing a communication link between the directory server and the user terminal; and
  transmitting the audiovisual content to the user terminal by one of streaming or downloading of an entire file.

6. The method of claim 1, wherein the characteristic is selected from available bandwidth, capabilities of the user terminal, and content security.

7. A non-transitory computer-readable medium storing instructions executable by a processor of a directory system and configured to perform a method of when executed by the processor, the method comprising:
  receiving over a network from a user terminal a request to view a directory listing;
  retrieving the directory listing from a directory database;
  presenting to the user terminal the directory listing;
  receiving, from the user terminal, a selection of a listing from the directory listing associated with a desired business entity;
  determining whether the selected listing includes an identifier of audiovisual content comprising an advertisement for the business entity, wherein the identifier comprises location information for retrieving the audiovisual content;

receiving over the network from the user terminal the identifier of audiovisual content;

accessing the audiovisual content based on the received identifier;

selecting a transmission method based at least in part on a characteristic of the user terminal;

providing an electronic directory page for the selected listing, the electronic directory page comprising:

a details display window on the page displaying data associated with the business entity and a favorites option for the selected listing; and a viewer display window on the page displaying the audiovisual content; providing the audiovisual content to the user terminal using the selected transmission method via the viewer display window;

receiving, from the user terminal, a selection of the favorites option; and in response to the selection of the favorites option, storing a reference to the selected listing in a user record associated with a user of the user terminal, the user record contained in a user database maintained by the directory system.

8. The non-transitory computer-readable medium of claim 7, further comprising instructions to base the characteristics on at least one of available bandwidth, capabilities of the user terminal, or content security issues.

9. A directory system, comprising:

a directory server connected to a network and accessible by at least one user terminal;

a directory database storing a plurality of directory listings; and a user database storing a plurality of records associated with users of the directory system;

wherein the directory server is configured to:

receive, over the network from the at least one user terminal, a request to view a directory listing;

retrieve the directory listing from the directory database;

transmit to the at least one user terminal the directory listing;

receive a selection of a listing in the directory listing associated with a desired business entity, from the at least one user terminal, the selection including the identifier of audiovisual content comprising an advertisement for the business entity, wherein the identifier comprises location information for retrieving the audiovisual content;

access the audiovisual content based on the identifier received in the selection;

select a transmission method based at least in part on a characteristic of the user terminal;

present to the user terminal an electronic directory page for the selected listing, the electronic directory page comprising:

a details display window on the page displaying data associated with the business entity and a favorites option for the selected listing; and a viewer display window on the page displaying the audio visual content; provide the audiovisual content to the at least one user terminal using the selected transmission method via the viewer display window;

receive, from the user terminal, a selection of the favorites option; and in response to the selection of the favorites option, store a reference to the selected listing in a record associated with a user of the user terminal contained in the user database, the user database being maintained by the directory system.

10. The system of claim 9, wherein the directory server is further configured to:

receive search criteria from the at least one user terminal; and present, in response to the search criteria, a plurality of responsive directory listings satisfying, at least in part, the search criteria;

wherein the selected listing is among the plurality of responsive directory listings.

11. The system of claim 10, wherein the search criteria is at least one of a category and a keyword.

12. The system of claim 11, wherein the keyword includes at least one of: a name, telephone number, street address, e-mail address, Internet web page address, uniform resource locator, product and service.

13. The system of claim 9, wherein the directory server is further configured to:

establish a communication link with the at least one user terminal; and transmit the audiovisual content to the at least one user terminal by one of streaming or downloading of an entire file.

14. The system of claim 9, wherein the characteristic is selected from available bandwidth, capabilities of the user terminal, or content security.

* * * * *